United States Patent [19]

Seidler et al.

[11] Patent Number: 5,781,990
[45] Date of Patent: Jul. 21, 1998

[54] METHOD AND DEVICE FOR PREPARING CABLE FOR SEPARATING INTO PORTIONS

[75] Inventors: Wolfgang Seidler, Meckenheim; Hans Willi Müller, Rheinbach; Gerhard Dargel, Erfurt, all of Germany

[73] Assignee: Klöckner-Moeller GmbH, Bonn, Germany

[21] Appl. No.: 577,126

[22] Filed: Dec. 22, 1995

[30] Foreign Application Priority Data

Jun. 24, 1993 [DE] Germany ............ 43 21 007.4

[51] Int. Cl.⁶ ............ H01R 43/00; B23P 23/00
[52] U.S. Cl. ............ 29/825; 29/569; 29/564.4; 81/9.51
[58] Field of Search ............ 81/9.51, 29/825, 29/867, 564, 564.4

[56] References Cited

U.S. PATENT DOCUMENTS

| | | |
|---|---|---|
| 2,920,513 | 1/1960 | Baird et al. |
| 3,155,136 | 11/1964 | Laskowski. |
| 3,363,309 | 1/1968 | Logan et al. ............ 29/867 |
| 3,364,801 | 1/1968 | Johnston. |
| 3,895,426 | 7/1975 | Papsdorf ............ 29/867 |
| 4,631,823 | 12/1986 | Collier et al. ............ 29/867 |
| 5,226,224 | 7/1993 | Ishizuka et al. ............ 29/825 |

FOREIGN PATENT DOCUMENTS

| | | |
|---|---|---|
| 0128314 | 12/1984 | European Pat. Off. |
| 0143936 | 6/1985 | European Pat. Off. |
| 2939360 | 4/1981 | Germany. |
| 3313654 | 10/1984 | Germany. |
| 3327583 | 2/1985 | Germany. |
| 3436668 | 4/1986 | Germany. |
| 3516668 | 1/1988 | Germany. |
| 3902697 | 8/1989 | Germany. |
| 4135997 | 5/1992 | Germany. |
| 870660 | 6/1961 | United Kingdom ............ 29/867 |
| 2052177 | 1/1981 | United Kingdom. |

Primary Examiner—Carl J. Arbes
Attorney, Agent, or Firm—Nils H. Ljungman and Associates

[57] ABSTRACT

In order to make it easier to wire controls or switch cupboards and to economically reduce the probability of wiring errors, the ready-for-use cable is tied to a sequence of interconnected cables. In order to produce the sequence of ready-for-use cables, their insulation is stripped off between the cables, the cables are soldered by ultrasonic waves and notched. The cable sequence matches the wiring sequence of an apparatus to be later wired. In addition, the insulation is designed as a collar or bead at the ends of the cables.

12 Claims, 8 Drawing Sheets

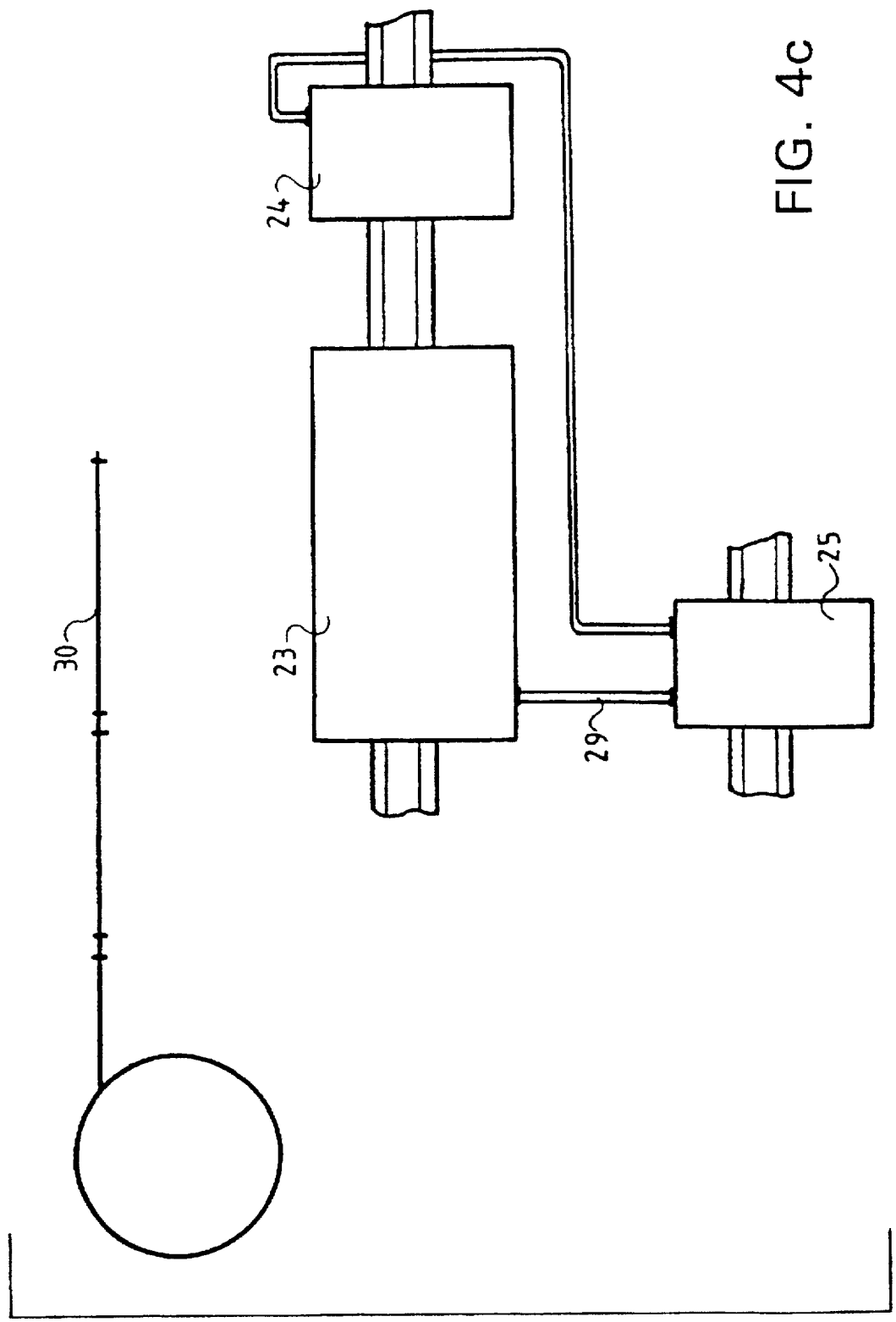

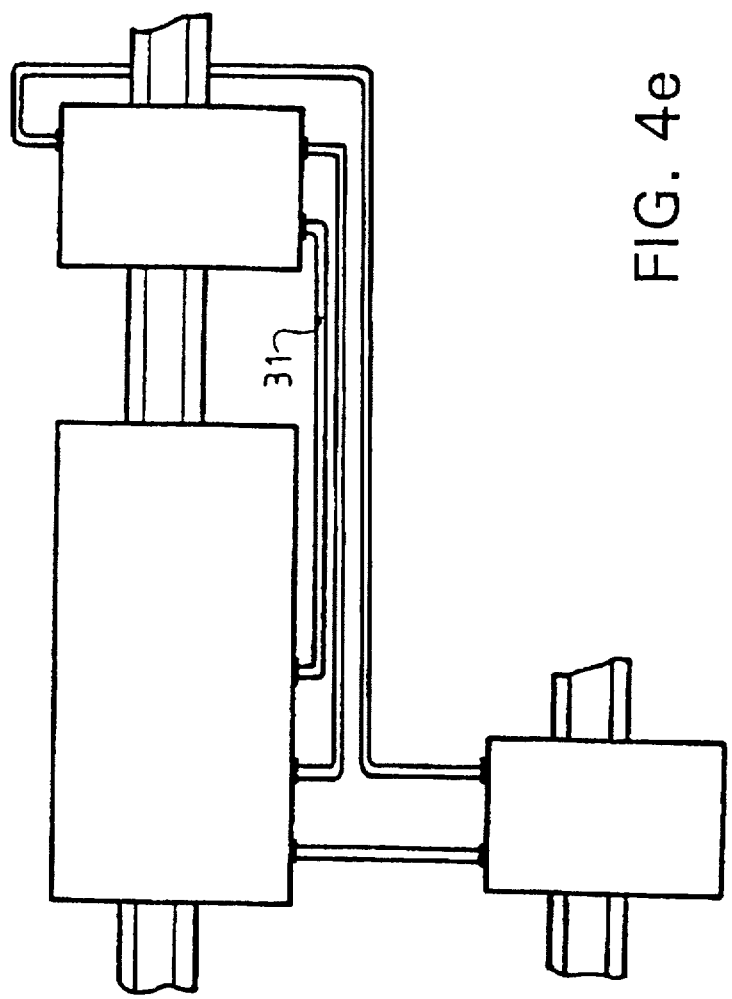
FIG. 4e

METHOD AND DEVICE FOR PREPARING CABLE FOR SEPARATING INTO PORTIONS

BACKGROUND OF THE INVENTION

1. Field of the Invention

This invention relates to a cable prepared for cutting to length and termination, in particular for the construction of equipment cabinets and control systems, and a method for its manufacture and a processing device for the purpose.

2. Background Information

In the construction of control systems, switchgear cabinets or in similar applications, such as in the automobile industry or the lighting fixtures industry, it is customary to use flexible cables or lines which are surrounded by thermoplastic insulation for the wiring of units or components.

For small production runs or for the manufacture of individual units, the prior art includes the practice of taking the wiring directly from a cable reel, whereby the cable is cut to length and provided with connectors immediately before the wiring is installed. In this case the cable, which can be used, for example, to make an electrical connection between two terminals in switchgear, control devices or similar devices, must typically be cut to the appropriate length. The ends of the lines are then stripped with a cable stripper or a similar device which removes the insulation, and are provided with connector sleeves or wire end ferrules. This type of wiring has the advantage that there is no excess length to the cables in the switchgear cabinet or in the unit, so that the wiring is neat and easy to trace, in particular when the cables are bundled into cable trees.

But this type of wiring is labor-intensive and is therefore not suitable for large production runs. When hand-held cable strippers are used, it is also difficult and time-consuming to achieve or maintain exactly the correct length over which the insulation must be removed from the conductor cross section, if it is necessary to comply with DIN standards.

Thermal strippers, for example in the form of bench models, are known. One example of which is shown in German Patent No. 35 16 668. Alternatively, tools which are easier to handle, are disclosed and described in European Patent No. 0 128 314. Compared to the cable stripper, the latter tool has the advantage that it leaves both hands free to handle the cable.

German Laid Open Patent Application No. 34 36 668 also discloses a method and a device to remove the primary coating of a fiber optics conductor.

Methods for the manufacture of a connection between control lines which do not require the removal of any insulation, are also known, and an example of which is illustrated and described in German Laid Open Patent Application No. 33 13 654. This operation also requires the use of a stripper tool which is similar to a pair of pliers.

The use of lines or cables prepared for cutting to length and termination significantly simplifies the task of wiring, preferably for wiring large numbers of units, because it makes possible a significant savings in assembly time.

Methods and devices for the manufacture of lines or cables prepared for cutting to length and termination, are indicated in German Laid Open Patent Application No. 39 02 697.

In this type of wiring, cable holders or magazines are used which hold bundles of cables or lines, of the same length, cut to length and prepared for termination. The line lengths are graduated, which means that the cables are frequently longer than necessary, which in turn entails an overall length of cable which is greater than in the type of wiring described above. In some cases, it is even necessary to recut the cables and reattach the connectors.

To facilitate the identification of which cables are to be connected to the individual cable terminals, the lines can be provided with a cable identification label, e.g. as disclosed in German Laid Open Patent Application No. 41 35 997.

If such cables are to be provided with such a marking when they are prepared for cutting to length and termination, problems can occur in relation to the correct installation of the prepared cables. The installation process must be designed so that the correct cable can be identified quickly. On account of the large number of cables and markings which result, it is sometimes difficult to do very much to simplify the process.

When connecting sleeves are used, not only are additional parts required, but complex and expensive machines are also necessary for mass production.

Great Britain Patent No. 2 0 52 177 A discloses a method and a cable chain or production line which makes it possible to wire directly from the wiring list or connection diagram, i.e. without the use of standard lengths. The cutting machine provided for this purpose cuts parts of the insulation according to the required lengths. During wiring, a remaining piece of insulation (40) must be cut and stripped. To get to the necessary length to be stripped, an additional cutting step is necessary, which involves the use of a cable stripper. For example, to be able to connect such a line to switchgear, such as protective devices or motor circuit breakers, the ends of the lines would also have to be fitted with connecting sleeves or similar devices. In this method, there is no protection against the insulation becoming caught in the terminal.

An additional method of storing individual conductors in magazines is disclosed by German Patent No. 33 27 583 A. In this method, individual conductors are cut to length, the insulation is removed and the conductors are provided with plugs. These conductors are then detachably connected to one another by means of coupling parts, so that they can be stored in the correct magazines. But one disadvantage of this method is that it requires both a large amount of mechanical equipment as well as the plugs. Additional unfavorable aspects include the necessity of the coupling pieces on the cable reel. Such lines are unsuitable for wiring switchgear, for example.

An additional type of storage in magazines is described in U.S. Pat. No. 3,155,136. The individual conductors, which have been previously separated from one another, are joined together by means of plugs which are connected to one another and are arranged in pairs. The cables connected to one another can then be wound onto a cable reel. These individual conductors and the plugs can be separated at the connecting points. But these individual conductors are also unsuitable for use in wiring switchgear cabinets, for example.

For the manufacture of individual conductors prepared for cutting to length and termination, an intermediate stripping of the insulation in the vicinity of two cable ends, and separating the connected cables at that point can be utilized, e.g. as shown in U.S. Pat. No. 3,364,801. The problem of the proper storage in magazines is not solved by this device, however.

German Patent No. 29 39 360 C discloses a device for cable trees in which, as the wires are being laid, the lines are provided with a marking by means of a hot embossing or hot stamping device, so that above all cables, preferably white in color, can be laid. This invention also makes it possible to remove cables of different cable thicknesses directly from cable magazines. The result is a closed cable run on a cable board. However, the installation device is incapable of achieving the object indicated below.

OBJECT OF THE INVENTION

The object of the present invention is therefore to create cable which has been prepared for cutting to length and termination for the construction of switchgear cabinets and control systems, to make possible wiring which is as economical, appropriate, neat, rapid and as nearly error-free as possible, without the presence of cables of excess length, or the complicated and expensive erection and arrangement of storage containers, and without the occurrence of miswiring, e.g. as a result of the insulation becoming caught in the terminals.

SUMMARY OF THE INVENTION

The object of the present invention is achieved by cable prepared for cutting to length and termination, in particular for the construction of switchgear cabinets and control systems, which is provided with insulation, and the cable ends of which are prepared so that they are suitable for connection to cable terminals. The prepared cable is installed in a sequence of prepared cables which are connected to one another and have not previously been separated from one another. The bare conductors or flexible leads or a point on the ends of the line are compressed using ultrasound, and the sequence of prepared cables is provided with rupture joints at the connecting points.

The invention simplifies the maintenance of inventories, as well as the transport and packing of the prepared cables, and also improves the handling of such cables. Storage containers or magazines are no longer necessary, likewise the orientation of the cables in such containers. Scrap is also eliminated, e.g. the bits of insulation or strips of flexible copper lead which generally fall on the floor during the wiring process.

It is economical if the bare conductors or flexible leads or the points on the ends of the lines are compressed using ultrasound.

It is possible to separate the cables later on, easily and without tools, if the sequence of the prepared cables is provided with rupture joints at the connecting points.

In one favorable method which is suitable for the mass production of such cables, the uncut, unseparated cables are fed to an intermediate stripping device which compresses the stripped points using ultrasound, and the ultrasonically compressed points are provided with a rupture joint in the middle, so that the lengths of prepared cable can easily remain on the reels.

It is also favorable if the rupture joint is formed during the process by means of bilateral notching with a blunt pair of blades, whereby the depressions are located opposite one another, and in particular if the depth of each notch is at least 25%, because the cables can be easily disconnected by bending, without tearing during the process.

If the sequence of the prepared cables is coordinated to the sequence in which the device, cabinet or similar object is to be wired, the same installation sequence will necessarily occur repeatedly, which is equivalent to improving the quality of the overall system and also simplifies troubleshooting. Additional advantages are savings in terms of time and materials.

The wiring process can be simplified significantly if the cable is provided with a printed marking on the beginning and end of the cable.

Identification labels as well as subsequent cutting are no longer necessary, if a marking is printed on the cable jacket or the cable insulation by means of an ink jet printer between the sites to be stripped.

It is also particularly favorable if the cutting device used to carry out the method includes a central control unit, an intermediate stripping unit, a downstream ultrasound compressor, a downstream notching unit, an ink jet printer and an automatic advance unit located on the preparation end for the transport and regulation of the cable length, and if the intermediate stripper device, the ultrasonic compressor, the notching device, the ink jet printer and the automatic advance unit are regulated and controlled by the central control unit. The ink jet printer can be advantageously located between the notching unit and the automatic advance unit.

It is also of particular advantage if the automatic advance unit includes two belts which run toward or opposite to one another, and are powered by means of a stepper motor, whereby the compressed points can be bridged, covered or spanned and precise deceleration, or braking, and positioning are possible.

So that the prepared cable can be neatly wound up without the risk of an unintentional separation between the precut segments, a coil winder to wind up the cable on a cable reel or similar device is located downstream of the automatic advance unit, whereby the coil winder exerts traction on the cable in the form of a constant and adjustable force.

It is also advantageous if the text or marking to be printed by the ink jet printer, which text or marking is made available by the central control system, occurs in the form of a "byproduct" of the work done by a CAE or computer-aided engineering system.

If the cable has a collar-shaped, ring-shaped or bead-like configuration of the insulation on the ends of the insulation, the result is a simple limitation of the depth to which the ends of the cable can be inserted in the connector, a finger protector, and also provides protection against the unintentional clamping of the insulation in the terminal.

An advantageous layout and economical preparation of the cable can be achieved if, downstream of the ultrasound compressor, or downstream of the notching device, there is a work station for the production of a ring-shaped collar or bead on the terminal points of the insulation, by heating and compression.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention, additional configurations and improvements of the invention and additional advantages of the invention are explained in greater detail below with reference to the embodiment which is illustrated in the accompanying drawings.

FIG. 4c is an illustration as in FIG. 4a, with two cables connected, FIG. 4e is an illustration as in FIG. 4a, with four cables connected.

DESCRIPTION OF THE PREFERRED EMBODIMENT

Figure 1:
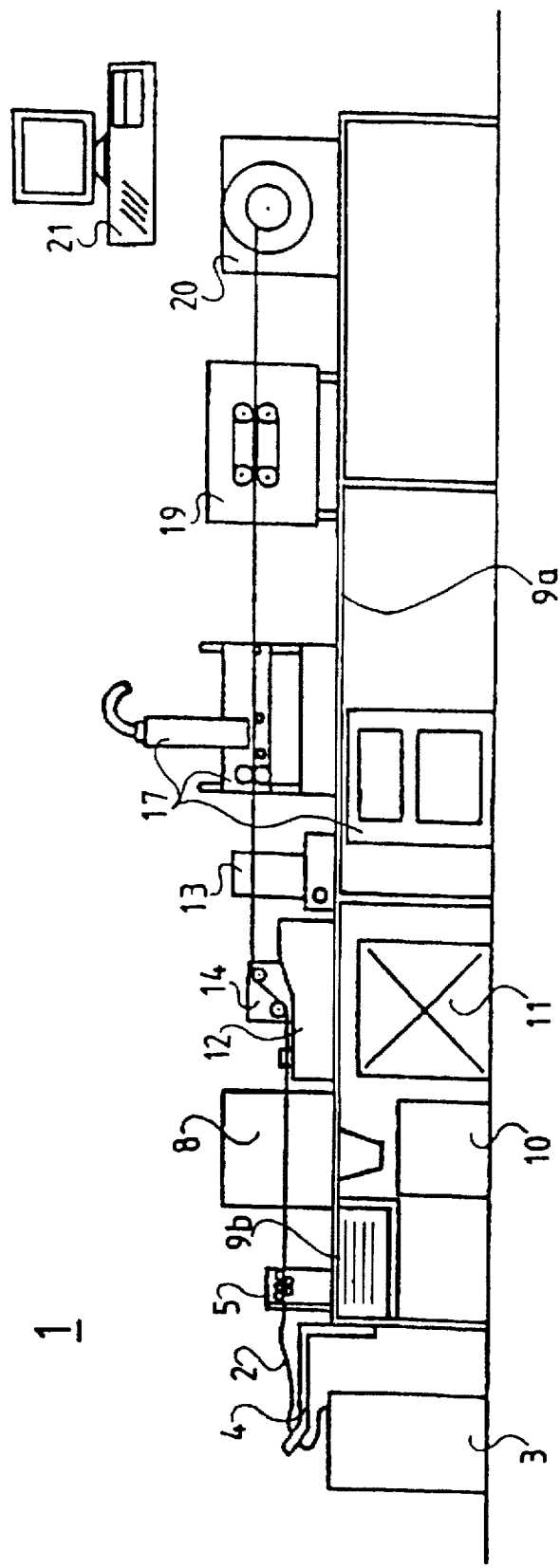
FIG. 1 is an illustration of a device for cutting cable and fitting it with connectors.

FIG. 1 shows a device 1 for the preparation of a flexible cable or for the manufacture of a cable 2 prepared for cutting to length and termination.

Cable 2 is placed in a cable drum 3 before it is transported to a straightening device 5 by means of a cable inlet 4, which cable inlet 4 is designed in the form of an extractor arm.

Figure 2B:
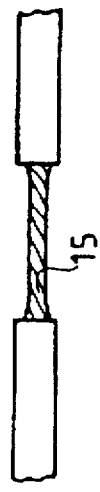
FIG. 2b is an illustration of the point where the cable has been compressed using ultrasound.
Figure 2D:
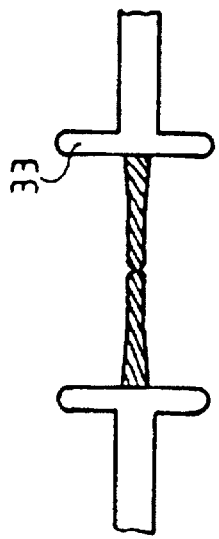
FIG. 2d is an illustration of the point at which the cable has a collar-shaped configuration.
Figure 2A:
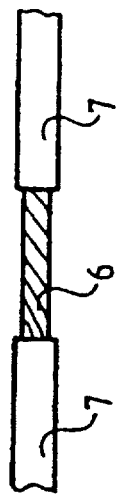
FIG. 2a is an illustration of the intermediate point at which the insulation has been stripped from the cable.

A downstream intermediate stripper unit 8 removes a piece of the insulation without cutting the cable, as shown in FIG. 2a. Insulation 7 is thereby located on the bare conductor piece 6 to both the right and left of the bare part 6.

In this case, the insulation is stripped by means of two ring cuts made along the periphery and one cut made lengthwise by cutting blades which are not shown in the illustration.

The insulation can also be removed thermally.

The intermediate stripping can also be called "center stripping".

In the vicinity of the straightening device 5, below a machine bench 9a, there is a control system 9b for the intermediate stripper unit 8.

A scrap container 10 located underneath the intermediate stripper unit 8 collects the insulation which has been removed from the cable.

The stripped point is then prepared by an ultrasound compressor 11, as shown in FIG. 2b.

The ultrasound compressor 11 has a compressor head 12, in which there is a system of anvils, a system of moving rods and a portion of the oscillator system. Such a system would be well known to one of ordinary skill in the art. The flexible lead is first mechanically pre-compressed by the system of rods and anvils, and is then compressed or welded by ultrasound waves.

Figure 2C:
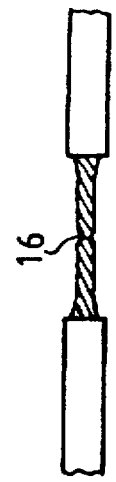
FIG. 2c is an illustration of the point at which the cable has been notched.

Following this step in the process, the cable 2 runs over deflector rollers 14 through a notching device 13, which uses a blunt pair of blades to make two notch-shaped depressions opposite one another in the center of the ultrasonically compressed point 15 (FIG. 2b) which is designed to serve as a rupture joint 16, as shown in FIG. 2c.

The depth of the notch is at least 25%, and preferably approximately one-third of the diameter of the ultrasonically compressed point. The notch angle is also approximately 60 degrees.

As a result of the ultrasonic compression and the notching, not only can the cable segments be easily separated from one another by bending, without any tools, but connecting sleeves are also essentially unnecessary.

Figure 3:
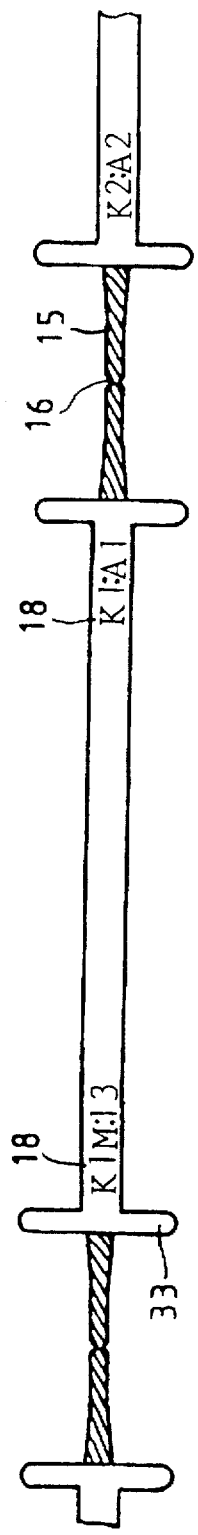
FIG. 3 is an illustration of a cable provided with markings.

An ink jet printer 17 which is located downstream of the notching device 13 prints, in the manner which would be well known to one of ordinary skill in the art, a legend or a marking 18 (see FIG. 3) on the terminal points of the insulation 7 next to the bare spots of the cable 2.

The markings 18 on the terminal points indicate the point to which the cable 2 is to be connected or the terminals of switchgear to which the cable 2 is to be connected, so that there is no need to trace the source and destination of each cable 2 in the corresponding current diagrams.

A job number or a similar identifying number can be printed by means of the ink jet printer 17 on a dummy cable for labelling purposes.

At the end of the preparation stations there is an automatic advance unit 19 which includes a transport unit which has two belts which run toward, or opposite, to one another. The belts are driven by a stepper motor. The automatic advance unit 19 is provided for the transport and regulation or control of the cable length.

To keep the slip and the axial forces as low as possible, it is favorable to operate the system with startup ramps. So that the cable does not tear at the rupture joints during processing, the transport speed is a maximum of about 0.6 m/s, or preferably a maximum of about 0.6 m/s.

The prepared cables 2 connected to one another at the rupture joints 16 are wound from the end into a coil winder 20, or onto a cable reel or spool. The coil winder 20 applies traction to the cable 2 with a constant and adjustable force downstream of the advance unit 19.

A central control unit 21 regulates and controls the operation of the ultrasonic compressor 11, the operation of the notching device 13, the labelling by the ink jet printer 17 and the cable lengths by which the cable is advanced in the automatic advance unit 19.

In this case, the central control unit 21 is integrated into a personal computer.

Figure 5:
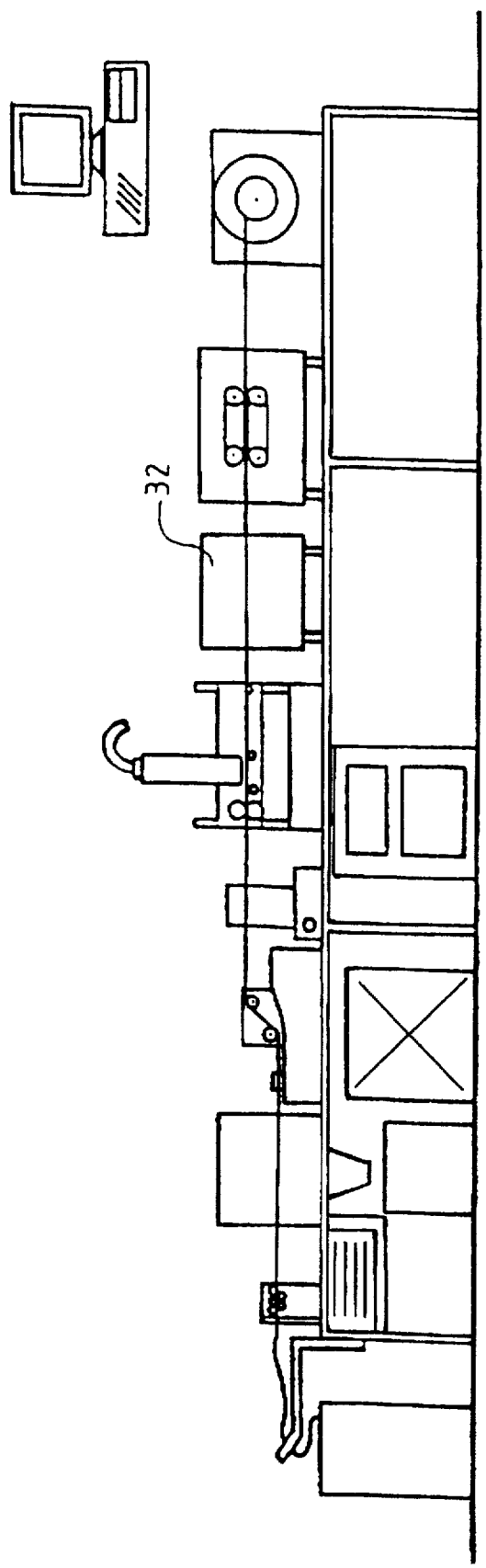
FIG. 5 is an illustration of a device for preparing cables for cutting to length and termination, with a process station for the production of collars on the ends of the insulation.

FIG. 5 shows the processing device 1 of FIG. 1 with an additional processing station 32. This station, which is located downstream of the ultrasonic compression and notching stations, forms the ends of the insulation 7 by the action of heat and subsequent compression into a ring-shaped collar 33, as shown in FIG. 2d. The insulation 7 is heated until it softens or even becomes viscous. The heat can be provided in the form of hot air or by means of a heated bar.

The diameter of the collar 33 is approximately two to three times the diameter of the insulation 7. The length of insulation to be compressed is approximately equal to the diameter of the insulation 7.

The collar 33 then acts as a limit stop during the introduction of the connection to the terminal, and as a finger protector. It also prevents the insulation 7 from becoming clamped in the terminal.

Additional elements, such as special connecting sleeves etc. are then typically unnecessary.

The processing can advantageously take place without the need to separate the lengths of cable 2.

The cable lengths of the prepared cables which are still connected to one another can be different, in particular if the sequence of the prepared cables in the cable reel coincides with the sequence in which the cables will subsequently be wired.

This portion of the process is explained in greater detail below with reference to FIGS. 4a to 4e.

In the figures, units 23, 24, 25 such as switchgear and control devices, for example, are illustrated on top-hat or DIN rails 26 or mounting rails which are to be wired in a switchgear cabinet or control cabinet.

Figure 4A:
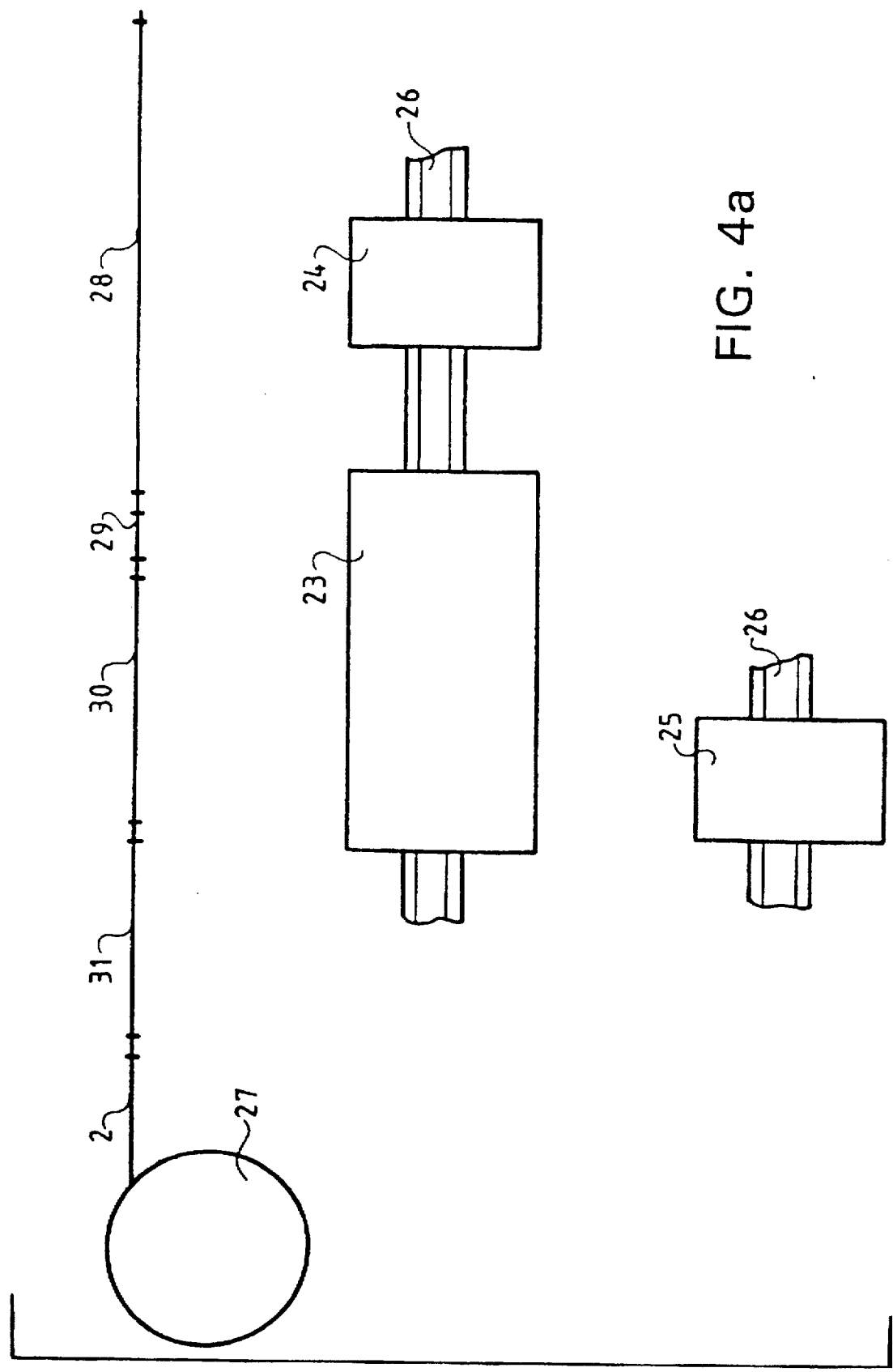
FIG. 4a is an illustration of prepared cables connected to one another, and a portion of a switchgear cabinet with switchgear or control devices to be wired.

The prepared cables 28, 29, 30, 31 are connected to one another in the order in which they are to be installed, and are shown in FIG. 4a being pulled off a cable reel 27. The length of the cable 2 is adapted to the required length.

The scale of the drawing of the cable of the cable reel 27 is in this case approximately one-half of the scale of the illustration with respect to the units 23, 24, 25.

Figure 4B:
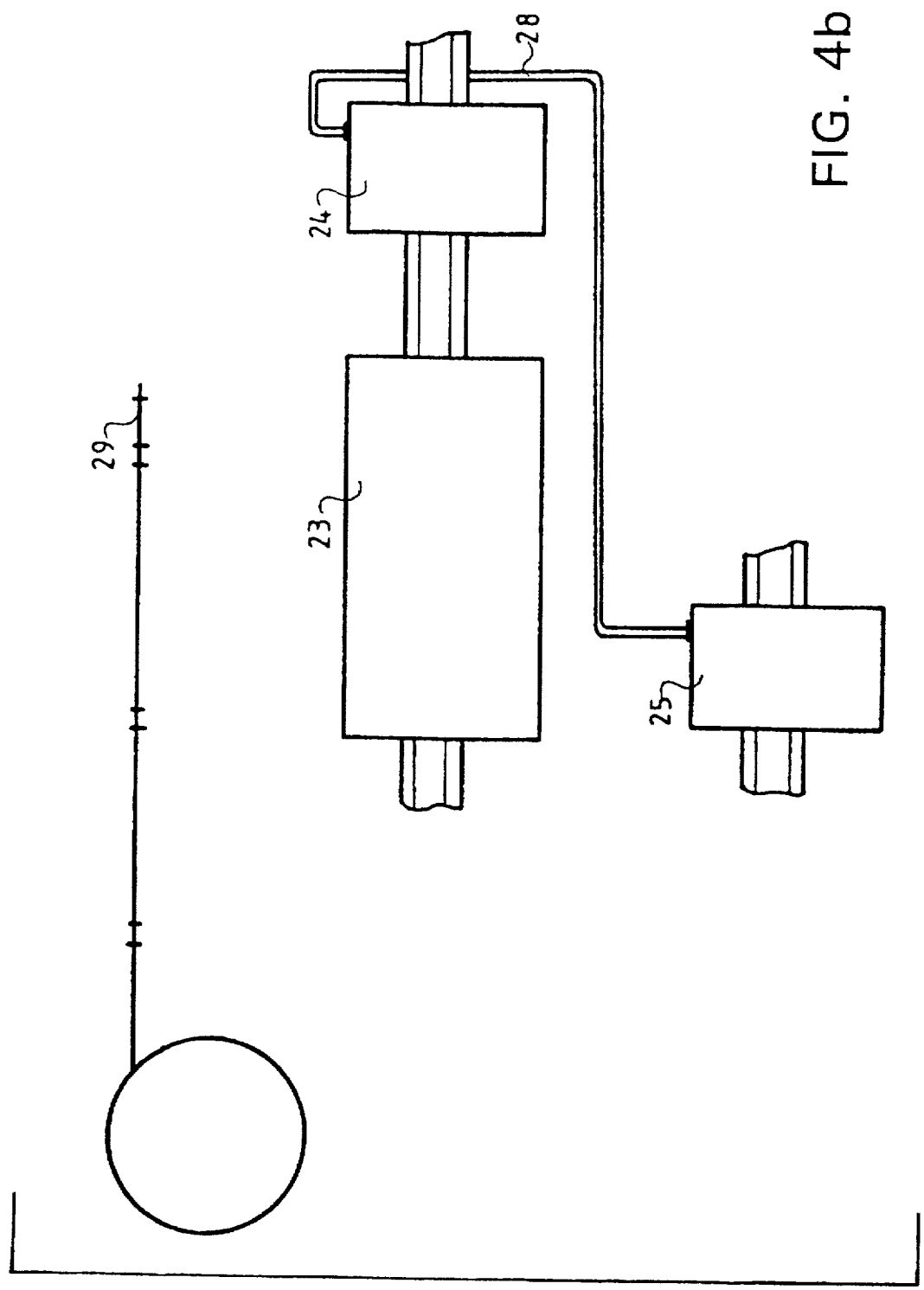
FIG. 4b is an illustration as in FIG. 4a, with one cable connected.

First the cable 28 in FIG. 4a is to be used to connect the devices 24 and 25 with the terminals indicated on the insulation 7, as explained above. For this purpose, the cable 28 need only be extracted from the cable reel 27, separated from the cable reel 27 by bending at the rupture joints 16, and connected to the terminal, as shown in FIG. 4b by way of example.

The cable 29, which in this case should necessarily be assumed to be the next cable to be connected, is then at the end of the cable reel 27 and is therefore in the correct position.

In FIG. 4c, the cable 29 is shown located between the devices 23 and 25. FIGS. 4a–e show that the cable length of the prepared cables 28 to 31 has been adapted to the required length, so that the wiring can be done neatly and troubleshooting is a simple operation.

Figure 4D:
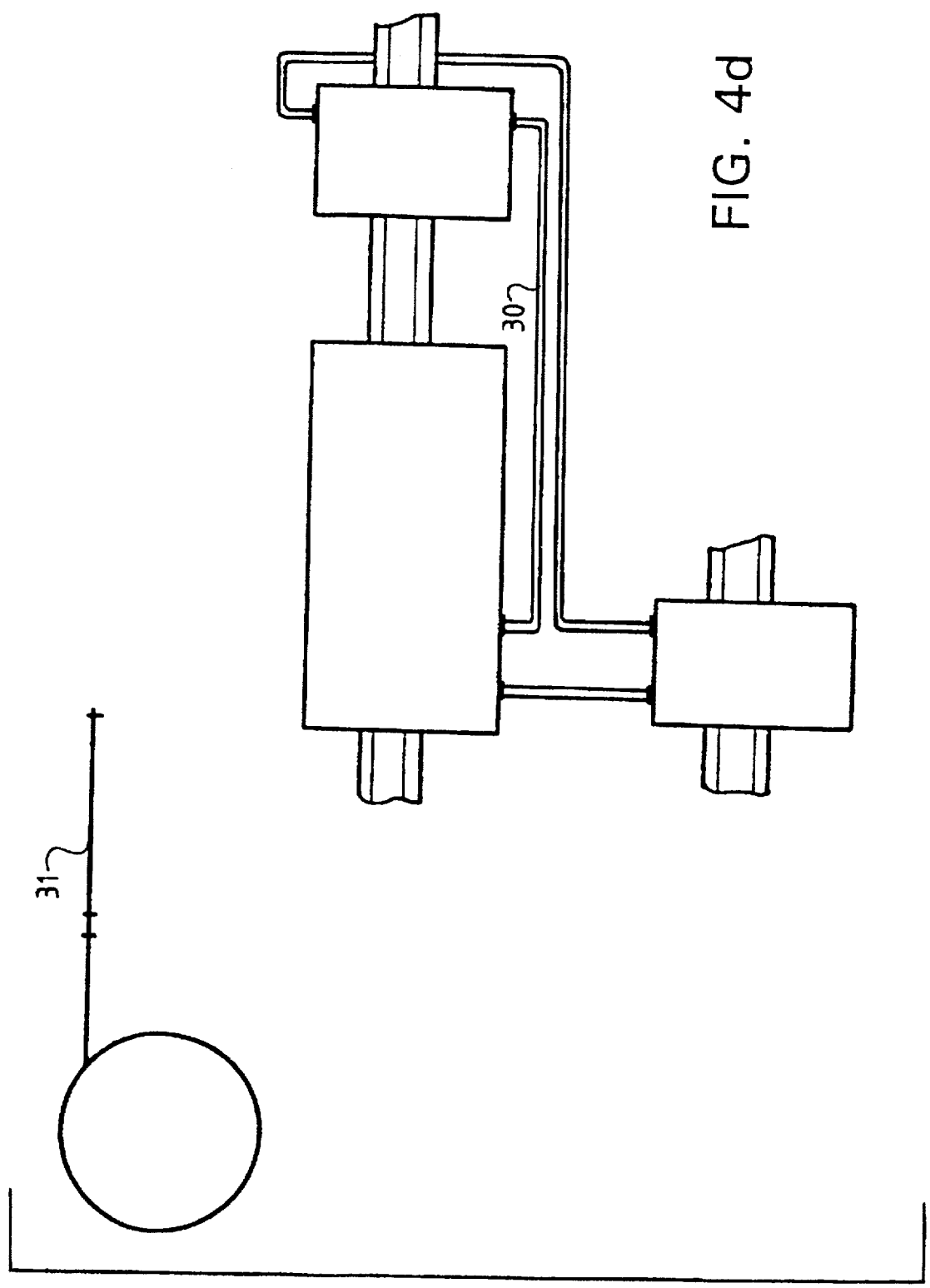
FIG. 4d is an illustration as in FIG. 4a, with three cables connected.

In FIGS. 4d and 4e, the cables 30, 31 which connect the devices 23 and 24 to one another are still in the foreground.

By means of this process in accordance with the present invention for the assembly and installation of switchgear cabinets, for example, and as a result of the sequence of the prepared cables connected to one another and the markings printed on them, wiring errors are reduced, and the same wiring sequence is performed over and over again, so that, for example, the switchgear cabinets need not always be assembled by the same assembly personnel, which simplifies subsequent troubleshooting for line tests. It also promotes standardization and leads to a consistent appearance of the cable bundle.

The method also saves material as a result of the optimum adjustment of the length of the individual conductors. There is also an efficient utilization of the space available for wiring, since no excess lengths of wire need to be included in the cable bundle.

The amount of work which must be performed by the assembly personnel is also reduced, to the extent that it is no longer necessary to search for and take the conductor or cable to be connected out of a storage container, since the conductors become available in a sequence which corresponds to the current position being installed.

The cable preparation device 1 can also be used to manufacture prepared lines or cables of equal length, whereby the lines of identical length are each located in respective cable reels. Prepared lines which are of different cable lengths can be in different cable reels. The different cable reels can then contain graduated lengths, so that these lines can also be used for a more flexible selection of wiring lengths, whereby the length of the individual conductors can be printed on the cables by means of the ink jet printer 17.

The extraction of the prepared cables from cable reels is particularly easy. The cable reels can be stored considerably higher or in less accessible locations than the locations required for known prepared lines, whereby the extraction points can then be located lower or in a more easily accessible location.

The prepared cables can also be used in automobile lighting or communications technology.

If the control of the intermediate stripper device is based on the handshake method with the central control unit, there is the advantage that the two machines always operate in a cycle which is correctly coordinated with one another.

Instructions for the execution of a job can be easily transmitted from the central manufacturing plant to an assembly plant when the data which are necessary for the fabrication of the cable sequences can be taken from a magnetic medium such as a diskette. The data can be stored directly on the diskette by a CAE or computer-aided engineering system, and can be sent to the manufacturing plant through the mail or by any other means. The data can also be transmitted electronically.

The information required for the execution of the order can be processed rapidly if the data which are necessary for the manufacture of the cable sequences are transmitted by means of a data telecommunications line.

One feature of the invention resides broadly in the cable prepared for cutting to length and termination, in particular for the construction of switchgear cabinets and control systems, which is provided with insulation, and the cable ends of which are prepared so that they are suitable for connection to cable terminals, characterized by the fact that the prepared cable 2 is installed in a sequence of prepared cables 2, 31, 30, 29, 28 which are connected to one another and have not previously been separated from one another, that the bare conductors or flexible leads or a point 15 on the ends of the line are compressed using ultrasound, and that the sequence of prepared cables 2 is provided with rupture joints 16 at the connecting points.

Another feature of the invention resides broadly in the method for the manufacture of cables prepared for cutting to length and termination characterized by the fact that the unprepared, unseparated cable 2 is fed to an intermediate stripping device 8, that the stripped points are compressed using ultrasound, that the ultrasonically compressed points are provided in the middle with a rupture joint 16, and whereby the cable is processed so that the result is a sequence of prepared cables which are connected to one another but have not yet been separated from one another.

Yet another feature of the invention resides broadly in the method characterized by the fact that the rupture joint 16 is made by notching, and that the rupture joint is produced by bilateral notching with a blunt pair of blades, whereby the depressions are located opposite one another, and whereby the depth of each notch is at least 25%.

Still another feature of the invention resides broadly in the cable prepared for cutting to length and termination, in particular for the construction of switchgear cabinets and control systems, which is provided with insulation and the cable ends of which are prepared so that they are suitable for connection to cable terminals, characterized by the fact that a sequence of prepared cables 2, 31, 30, 29, 28 connected to one another coincides with the sequence in which a unit or similar device will subsequently be wired, whereby the cables have intermediate stripped points, that each cable 2 is printed with a printed marking 18 on the beginning and the end, in the middle, or both of the above, and that the marking 18 is applied by means of an ink jet printer 17.

A further feature of the invention resides broadly in the processing device to carry out the method characterized by the fact that the processing device consists of a central control unit 21, an intermediate stripper unit 8, a downstream ultrasonic compressor 11, a downstream notching device 13, an ink jet printer 17 and an automatic advance unit 19 located at the end of the processing for the transport and regulation of the length of the cable, and that the intermediate stripper unit 8, the ultrasonic compressor 11, the notching device 13, the ink jet printer 17 and the advance unit 19 are regulated and controlled by the central control unit 21, whereby the ink jet printer 17 is located between the notching device 13 and the advance unit 19, and that the text or marking to be printed by the ink jet printer 17 is made available by the central control system 21.

Another feature of the invention resides broadly in the processing device to carry out the method characterized by the fact that the automatic advance unit 19 consists of two belts which run toward, or opposite to, one another, which belts are driven by a stepper motor, and that downstream of the advance unit 19 there is a coil winder 20 for winding the cable onto a cable reel or similar device, whereby the coil winder 20 exerts traction on the cable 2 with a constant and adjustable force.

Yet another feature of the invention resides broadly in the processing device to carry out the method characterized by the fact that data which contain the wiring information, such as the wiring installation sequence, cable length or marking, are generated by an engineering system.

Still another feature of the invention resides broadly in the cable prepared for cutting to length and termination, in particular for the construction of switchgear cabinets and control systems, which cable is provided with insulation, and the cable ends of which are processed so that they are suitable for connection to cable terminals, characterized by the fact that the cable 2 has a collar-shaped or bead-shaped configuration of the insulation 7 on the ends of the insulation.

A further feature of the invention resides broadly in the processing device for a cable characterized by the fact that downstream of an ultrasonic compressor 11 there is a processing station 32 which produces a ring-shaped collar 33 or bead on the ends of the insulation by heating and compression.

Another feature of the invention resides broadly in the use of a cable for the assembly or installation of switchgear or a switchgear cabinet for energy distribution or for the wiring of switching, command, control or display equipment, such as power circuit breakers, motor circuit breakers, protective devices, cam-operated controllers, control units, display elements, stored-program controls or programmable controls.

One feature of the invention resides broadly in the cable prepared for cutting to length and termination, in particular for the construction of switchgear cabinets and control systems, which is provided with insulation, and the cable ends of which are prepared so that they are suitable for connection to cable terminals, whereby the prepared cable 2 is installed in a sequence of prepared cables 2, 31, 30, 29, 28 which are connected to one another and have not previously been separated from one another, whereby there are also points 15 as connecting points, characterized by the fact that the bare conductors or flexible leads or a point 15 on the ends of the line is compressed using ultrasound, and that the sequence of prepared cables 2 is provided with rupture joints 16 at the connecting points.

Another feature of the invention resides broadly in the cable prepared for cutting to length and termination as, in particular for the construction of switchgear cabinets and control systems, characterized by the fact that a sequence of prepared cables 2, 31, 30, 29, 28 connected to one another coincides with the sequence in which a unit or similar device will subsequently be wired, whereby the cables have intermediate stripped points, that each cable 2 is printed with a printed marking 18 on the beginning and the end, in the middle, or both of the above, and that the marking 18 is applied by means of an ink jet printer 17.

Yet another feature of the invention resides broadly in the cable prepared for cutting to length and termination characterized by the fact that the cable 2 has a collar-shaped or bead-shaped configuration of the insulation 7 on the ends of the insulation.

Still another feature of the invention resides broadly in the method for the manufacture of cables prepared for cutting to length and termination characterized by the fact that the unprepared, unseparated cable 2 is fed to an intermediate stripping device 8 where the insulation is removed, that the stripped points are compressed using ultrasound, that the ultrasonically compressed points are provided in the middle with a rupture joint 16, and whereby the cable is processed so that the result is a sequence of prepared cables which are connected to one another but have not yet been separated from one another.

A further feature of the invention resides broadly in the method characterized by the fact that the rupture joint 16 is made by notching, and that the rupture joint is produced by bilateral notching with a blunt pair of blades, whereby the depressions are located opposite one another, and whereby the depth of each notch is at least 25%.

Another feature of the invention resides broadly in the processing device to carry out the method characterized by the fact that the processing device consists of a central control unit 21, an intermediate stripper unit 8, a downstream ultrasonic compressor 11, a downstream notching device 13, an ink jet printer 17 and an automatic advance unit 19 located at the end of the processing for the transport and regulation of the length of the cable, and that the intermediate stripper unit 8, the ultrasonic compressor 11, the notching device 13, the ink jet printer 17 and the advance unit 19 are regulated and controlled by the central control unit 21, whereby the ink jet printer 17 is located between the notching device 13 and the advance unit 19, and that the text or marking to be printed by the ink jet printer 17 is made available by the central control system 21.

Yet another feature of the invention resides broadly in the processing device characterized by the fact that the automatic advance unit 19 consists of two belts which run toward, or opposite to, one another, which belts are driven by a stepper motor, and that downstream of the advance unit 19 there is a coil winder 20 for winding the cable onto a cable reel or similar device, whereby the coil winder 20 exerts traction on the cable 2 with a constant and adjustable force.

Still another feature of the invention resides broadly in the processing device for a cable characterized by the fact that data which contain the wiring information, such as the wiring installation sequence, cable length or marking, are generated by an engineering system such as a CAE or computer-aided engineering system.

A further feature of the invention resides broadly in the processing device for a cable characterized by the fact that downstream of an ultrasonic compressor 11 there is a processing station 32 which produces a ring-shaped collar 33 or bead on the ends of the insulation by heating and compression, and that the processing station 32 heats the insulation 7 until it is soft or viscous.

Another feature of the invention resides broadly in the use of a cable for the assembly or installation of switchgear or a switchgear cabinet for energy distribution or for the wiring of switching, command, control or display equipment, such as power circuit breakers, motor circuit breakers, protective devices, cam-operated controllers, control units, display elements, stored-program controls or programmable controls.

Examples of switchgear cabinets and control systems which could possible be constructed using the present invention as set forth hereabove can possibly be found in U.S. Pat. No. 5,202,818, entitled "Sealed Swithgear Cabinet"; U.S. Pat. No. 5,330,213, entitled "Fifth Wheel Device for Rackable Switchgear Units"; U.S. Pat. No. 5,177,418, entitled "Sweep Control Apparatus for Windshield Wipers"; U.S. Pat. Nos. 5,189,839, entitled "Control Apparatus for Powered Vehicle Door Systems"; 5,243,513, entitled "Automation Control with Improved Operator/System Interface"; and U.S. Pat. No. 5,280,223, entitled "Control System for an Electrically Propelled Traction Vehicle."

Examples of cables which could possibly be used in conjunction with the present invention as set forth hereabove can possibly be found in U.S. Pat. No. 5,334,798, entitled "Interconnect Cable With Built-In Shielding and Method of Use"; U.S. Pat. No. 5,187,009, entitled "Rubber/Plastic Insulated Power Cables and a Joint Thereof and a Method for Manufacturing the Same"; U.S. Pat. No. 5,191,173, entitled "Electrical Cable in Reeled Tubing"; U.S. Pat. No. 5,191,292, entitled "Method of Making a Sensor Cable"; and U.S. Pat. No. 5,209,987, entitled "Wire and Cable."

Examples of wire stripping units or devices which could possibly be used in conjunction with the present invention as set forth hereabove can possibly be found in U.S. Pat. No. 5,203,237, entitled "Notched Blade for Rotary Wire Stripper"; U.S. Pat. No. 5,243,882, entitled "Rotary Wire Stripper"; U.S. Pat. No. 5,257,555, entitled "Thermal Wire Stripper Having a Static Discharge Circuit"; U.S. Pat. No. 5,333,521, entitled "Wire Stripper"; and U.S. Pat. No. 5,320,002, entitled "Machine for Stripping Outer Jacket from Multi-Conductor Cables."

Examples of wire straightening devices which could possibly be used in conjunction with the present invention as set forth hereabove can possibly be found in U.S. Pat. No. 5,327,757, entitled "Straightening Jaws for a Straightening Device for Straightening Wire"; U.S. Pat. No. 5,353,235, entitled "Wire Length Minimization in Channel Compactor"; and U.S. Pat. No. 5,232,463, entitled "Apparatus for Manufacturing a Semiconductor Device."

Examples of a notching device that could possibly be used in conjunction with the present invention as set forth hereabove can possibly be found in U.S. Pat. No. 5,195,237, entitled "Flying Leads for Integrated Circuits"; U.S. Pat. No. 5,231,862, entitled "Tube Base Notcher"; U.S. Pat. No. 5,267,497, entitled "Dual Action Punch for Use in a Reciprocating Operation Capable of Scarfing and Piercing Material"; and U.S. Pat. No. 5,319,983, entitled "Notching Machine and Method for Mechanical Testing Specimens."

Examples of ultrasonic compressors and/or welding devices which could possibly be used in conjunction with the present invention as set forth hereabove can possibly be found in U.S. Pat. No. 5,178,147, entitled "Method and Apparatus for Elastographic Measurement and Imaging"; U.S. Pat. No. 5,198,056, entitled "Method and Device for Ultrasonic Welding or Printing Ribbons"; U.S. Pat. No. 5,321,224, entitled "Methods of Modifying Surface Qualities of Metallic Articles and Apparatuses Therefor"; and U.S. Pat. No. 5,269,713, entitled "Method of Forming an Electrical Connection, and Terminal Formed Thereby."

Examples of printers which could possibly be used in conjunction with the present invention as set forth hereabove could possibly be found in U.S. Pat. No. 5,185,055, entitled "Method of Forming a Pattern on a Surface"; U.S. Pat. No. 5,189,442, entitled "Franking Machine With Ink Jet Printer Utilizing Melted Solid Ink"; U.S. Pat. No. 5,242,489, entitled "Ink Jet Printing Processes"; U.S. Pat. No. 5,262,804, entitled "Bar Code Printing"; U.S. Pat. No. 5,294,946, entitled "Ink Jet Printer"; U.S. Pat. No. 5,296,873, entitled "Airflow System for Thermal Ink-Jet Printer"; and U.S. Pat. No. 5,300,950, entitled "Interlaced Ink Jet Printer."

Examples of advance units and/or stepper motors which could possibly be used in conjunction with the present invention as set forth hereabove could possibly be found in U.S. Pat. No. 5,190,727, entitled "Device for Moving and Positioning Pipette Trays in an Analyzer"; U.S. Pat. No. 5,208,523, entitled "Stepper Motor with Vernier Control Mode"; U.S. Pat. No. 5,216,347, entitled "Stepper Motor Control System"; U.S. Pat. No. 5,220,224, entitled "Stepper Motor with Integrated Assembly"; U.S. Pat. No. 5,187,917, entitled "Automatic Packaging Apparatus and Method and Flexible Pouch Therefor"; U.S. Pat. No. 5,195,861, entitled "Automatic Rate Matching System"; U.S. Pat. No. 5,220,995, entitled "Device for Diverting a Moving Flow of Products, Particularly for Packaging Machines"; and U.S. Pat. No. 5,248,029, entitled "Belt Conveyor Having an Automatic Belt Centering Device and the Centering Device Therefor."

Examples of coil winder methods or devices which could possibly be used in conjunction with the present invention as set forth hereabove could possibly be found in U.S. Pat. No. 5,190,236, entitled "Wire Coiler with Rotating Winding Drum"; U.S. Pat. No. 5,314,129, entitled "Coil Winder With Spindlehead Movable in a Horizontal Plane"; U.S. Pat. No. 5,187,856, entitled "Armature Winding Apparatus"; and U.S. Pat. No. 5,209,414, entitled "Apparatus for Precisely Winding a Coil of Wire."

Examples of methods and devices for cable encoding and preparation, and components thereof which could possibly be used in conjunction with the embodiments of the present invention as set forth hereabove can possibly be found in U.S. Pat. No. 5,187,854, entitled "Coding Method for Electric Cable"; and U.S. Pat. No. 5,223,852 entitled "Methods and Apparatus for Printing onto Cable Jacket."

Examples of computer programs and components thereof which could possibly be used in conjunction with the embodiments of the present invention as set forth hereabove can possibly be found in U.S. Pat. No. 5,327,568, entitled "Apparatus for Supporting Graphic Data Driven Program Development and for Displaying Instruction Execution Results Superimposed on the Graphic Program"; U.S. Pat. No. 5,349,248, entitled "Adaptive Programming Method for Antifuse Technology"; U.S. Pat. No. 5,197,009, entitled "Apparatus for and Method of Creating Delivery Route Maps"; U.S. Pat. No. 5,202,828, entitled "User Interface System Having Programmable User Interface Elements"; U.S. Pat. No. 5,341,293, entitled "User Interface System Having Programmable User Interface Elements"; and U.S. Pat. No. 5,257,363, entitled "Computer-aided Generation of Programs Modelling Complex Systems Using Colored Petri Nets."

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Method for the manufacture of pre-fabricated cables prepared for separation into individual unconnected cable portions for connection to cable terminals in electrical equipment, such as one of: switchgear, a switchgear cabinet and a control system, said method comprising steps of:

providing cable comprising conducting material having at least one conductor, and insulating material disposed concentrically about the conducting material;

feeding the cable into a stripping device;

stripping sections of insulating material from the cable at predetermined distances along the cable to provide individual connected cable portions;

forming in said stripped sections rupturable joints for maintaining a plurality of said individual connected cable portions and for readily permitting separation of said connected cable portions into individual unconnected cable portions; and leaving at least a portion of said at least one conductor extending from one of said connected cable portions to another of said connected cable portions through the rupturable joint connecting said one of said connected cable portions to another of said connected cable portions.

2. The method according to claim 1 wherein said method further comprises compressing the cable at the stripped sections.

3. The method according to claim 2, wherein said step of forming the rupturable joints comprises:

bilateral notching of the conducting material with a pair of blunt blades;

making said notches opposite one another;

making said notches a depth of at least 25% of the diameter of said conducting material; and said step of compressing the cable at the stripped section comprises using ultrasound to produce said compression.

4. The method according to claim 3 wherein said method further comprises the steps of:

automatically advancing and transporting the cable along a predetermined processing route;

regulating the lengths of the individual cable portions; and labelling the individual cable portions with identification information.

5. The method according to claim 4 wherein said method further comprises the steps of:

centrally controlling and regulating at least one of the steps of:
said stripping;
said compressing;
said notching;
said automatic advancing;
said regulating the lengths; and
said labelling;

generating wiring information data wherein said wiring information data comprises at least one of:
wiring installation sequence;
lengths of said cable portions; and
said cable portion labellings;

forming ring-shaped collar areas from the insulating material, said collar areas being disposed at each end of each of the individual cable portions;

winding the prepared cable onto cable holding means; and exerting a constant and adjustable force on said cable.

6. Method for the manufacture of pre-fabricated cables prepared for separation into individual unconnected cable portions for connection to cable terminals in electrical equipment, such as one of: switchgear, a switchgear cabinet and a control system, with an apparatus, the pre-fabricated cable comprising: conducting material comprising at least one conductor; insulating material disposed concentrically about the conducting material; sections of conducting material stripped of the insulating material; the stripped sections being disposed at predetermined distances along the cable to provide individual connected cable portions; the stripped sections comprising rupturable joints for maintaining a plurality of the individual connected cable portions and for readily permitting separation of the connected cable portions into individual unconnected cable portions; the individual unconnected cable portions for being connected between predetermined terminals in electrical equipment; and at least a portion of the at least one conductor extending from one of the connected cable portions to another of the connected cable portions through the rupturable joint connecting the one of the connected cable portions to another of the connected cable portions; the apparatus comprising: a plurality of processing stations; the processing stations comprising: a stripping unit, for removing sections of insulating material from the cable to provide individual connected cable portions; a compressor unit disposed downstream of the stripping unit, for compressing the conducting material in the stripped sections; and a notching device disposed downstream of the stripping unit, for notching the cable in the stripped sections to provide rupturable joints for maintaining a plurality of the individual connected cable portions and for readily permitting separation of the connected cable portions into individual unconnected cable portions, while leaving at least a portion of the at least one conductor extending from one of the connected cable portions to another of the connected cable portions through the rupturable joint connecting the one of the connected cable portions to another of the connected cable portions; an advancing unit for the transport of the cable along a predetermined processing route; central control means for regulating and controlling at least some of: the stripping unit; the compressor unit; the notching device; and the advancing unit; the central control means comprising means for storing predetermined lengths and predetermined sequences of the individual connected cable portions and for tranferring the predetermined length information to the advancing unit; and the advancing unit comprising means for regulating the length and sequence of said individual connected cable portions in response to said predetermined length and sequence information received from said central control unit; said method comprising steps of:

providing cable comprising conducting material having at least one conductor, and insulating material disposed concentrically about the conducting material;

providing the stripping device;

providing the compressor unit;

providing the notching device;

providing the advancing unit;

providing the means for regulating;

providing the central control means;

providing the means for storing and transferring;

transporting the cable along a predetermined processing route;

feeding the cable into the stripping device;

stripping sections of insulating material from the cable at predetermined distances along the cable to provide individual connected cable portions, with the stripping device;

forming in the stripped sections rupturable joints for maintaining a plurality of the individual connected cable portions and for readily permitting separation of the connected cable portions into individual unconnected cable portions for being connected between predetermined terminals in electrical equipment;

said step of forming in said stripped sections rupturable joints comprising:

feeding the cable into the compressor unit;

compressing the conducting material in the stripped sections, with the compressor unit;

feeding the cable into the notching device;

notching the cable, with the notching device, in the stripped sections to provide rupturable joints for maintaining a plurality of the individual connected cable portions and for readily permitting separation of the connected cable portions into individual unconnected cable portions; and leaving at least a portion of the at least one conductor extending from one of the connected cable portions to another of the connected cable portions through the rupturable joint connecting the one of the connected cable portions to another of the connected cable portions;

regulating and controlling, with the central control means, at least some of: the stripping unit; the compressor unit; the notching device; and the advancing unit;

storing, with the means for storing of the central control means predetermined lengths and predetermined sequences of the individual connected cable portions and tranferring the predetermined length information to the advancing unit; and regulating, with the means for regulating of the advancing unit, the length and sequence of the individual connected cable portions in response to the predetermined length and sequence information received from the central control unit.

7. Apparatus for producing pre-fabricated cable prepared for separation into individual unconnected cable portions for connection to cable terminals in electrical equipment, such as one of: switchgear, a switchgear cabinet and a control system, the cable comprising conducting material comprising at least one conductor, and insulating material disposed concentrically about the conducting material, said apparatus comprising:

a plurality of processing stations;

said processing stations comprising:

a stripping unit, for removing sections of insulating material from the cable to provide individual connected cable portions;

a compressor unit disposed downstream of said stripping unit, for compressing the conducting material in the stripped sections; and a notching device disposed downstream of said stripping unit, for notching the cable in the stripped sections to provide rupturable joints for maintaining a plurality of the individual connected cable portions and for readily permitting separation of the connected cable portions into individual unconnected cable portions, while leaving at least a portion of said at least one conductor extending from one of said connected cable portions to another of said connected cable portions through the rupturable joint connecting said one of said connected cable portions to another of said connected cable portions;

an advancing unit for the transport of said cable along a predetermined processing route;

central control means for regulating and controlling at least some of:

said stripping unit;

said compressor unit;

said notching device; and said advancing unit;

said central control means comprising means for storing predetermined lengths and predetermined sequences of the individual connected cable portions and for tranferring said predetermined length information to said advancing unit; and said advancing unit comprising means for regulating the length and sequence of said individual connected cable portions in response to said predetermined length and sequence information received from said central control unit.

8. The apparatus according to claim 7, wherein:

said compressor unit comprises means for ultrasonically compressing the conducting material in the stripped sections;

said apparatus further comprises a printer unit disposed between said notching device and said automatic advance unit, for printing identification markings on the individual cable portions; and said central control means comprises means for regulating and controlling said printer unit.

9. The apparatus according to claim 8, wherein:

said central control means comprises a central control unit;

said printer unit comprises an ink jet printer; and said central control unit supplies said identification information to said ink jet printer.

10. The apparatus according to claim 9 wherein:

said advancing unit comprises:
 two belts disposed adjacent to one another and moving in opposite directions from one another;
 a stepper motor for driving said belts;

said apparatus further comprises:

coil winder means for exerting a constant and adjustable force on the cable, and for winding the prepared cable onto cable holding means; and said coil winder means is disposed downstream of said advance unit.

11. The apparatus according to claim 10, wherein said apparatus further comprises:

engineering system means for generating wiring information data;

said wiring information data comprises at least one of:
 a wiring installation sequence;
 lengths of the cable portions; and
 the cable portion labellings.

12. The apparatus according to claim 11 wherein:

said engineering system means comprises a computer-aided engineering system;

said processing stations further comprise:

a collar forming unit;

said collar forming unit comprises means for producing ring-shaped collars of the insulating material;

said means for producing ring-shaped collars comprising:
 means for heating the insulating material until the insulating material is one of:
  soft; and
  viscous; and
 means for compressing the insulating material to form said ring-shaped collars;

the connected cable portions each have two end portions disposed opposite to one another and adjacent said stripped sections of the cable; and one of said ring-shaped collars is formed at each of the two end portions of each connected cable portion.

* * * * *

UNITED STATES PATENT AND TRADEMARK OFFICE
CERTIFICATE OF CORRECTION

PATENT NO. : 5,781,990
DATED : July 21, 1998
INVENTOR(S) : Wolfgang SEIDLER, Hans Willi MÜLLER and Gerhard DARGEL It is certified that error appears in the above-identified patent and that said Letters Patent is hereby corrected as shown below:

On the title page, item [22], after
December 22, 1995' insert the following information:

--Related U.S. Application Data

[63] Continuation-in-part of PCT/DE 94/00694,
     June 18, 1994.--.

In column 1, after the title of the invention insert the following information: --CONTINUING APPLICATION DATA This application is a Continuation-In-Part Application of International Application No. PCT/DE94/00694, filed on June 18, 1994, which claims priority from Federal Republic of Germany Application No. P 43 21 007.4, filed on June 24, 1993. International Application No. PCT/DE94/00694 was pending as of the filing date of this application and designated the USA as a designated state.--.

Signed and Sealed this

Fourth Day of May, 1999

Attest:

Q. TODD DICKINSON

*Attesting Officer*    *Acting Commissioner of Patents and Trademarks*